United States Patent [19]

Jaulmes

[11] Patent Number: 4,488,617
[45] Date of Patent: Dec. 18, 1984

[54] FOUR-WHEEL VEHICLE

[75] Inventor: Christian Jaulmes, Paris, France

[73] Assignee: Ateliers de la Motobecane, Pantin, France

[21] Appl. No.: 491,584

[22] Filed: May 4, 1983

[30] Foreign Application Priority Data

May 12, 1982 [FR] France ................ 82 08217

[51] Int. Cl.³ .............................. B62K 5/00
[52] U.S. Cl. ........................ 180/209; 280/282
[58] Field of Search ........... 180/21, 209; 280/282

[56] References Cited

U.S. PATENT DOCUMENTS

| | | | |
|---|---|---|---|
| 1,546,165 | 7/1925 | Boehm | 180/209 |
| 1,730,282 | 10/1929 | McClure et al | 180/209 |
| 1,796,339 | 3/1931 | Nicholson | 180/209 |
| 1,835,077 | 12/1931 | Nicholson | 180/209 |
| 3,236,323 | 2/1966 | Austin | 180/209 |
| 4,087,107 | 5/1978 | Winchell | 180/21 |

FOREIGN PATENT DOCUMENTS

| | | | |
|---|---|---|---|
| 349557 | 6/1905 | France | 180/209 |
| 1396383 | 3/1965 | France | 180/209 |
| 2399354 | 3/1979 | France | 180/209 |
| 429882 | 2/1948 | Italy | 180/209 |

*Primary Examiner*—Joseph F. Peters, Jr.
*Assistant Examiner*—Ross Weaver
*Attorney, Agent, or Firm*—Browdy and Neimark

[57] ABSTRACT

This invention relates to a four-wheeled vehicle intended to be driven as a moped. The vehicle chassis consists of a frame, with four wheels placed in a rhombus pattern. It includes a back drive wheel whose axle is carried by a frame and a front steering wheel whose axle is carried in a fork which is guided in a tube of the frame and which is solid with a handlebar. The steering wheel and fork, like the frame, is centered in relation to the plane of symmetry of the vehicle. The vehicle includes two side stabilizing wheels.

8 Claims, 7 Drawing Figures

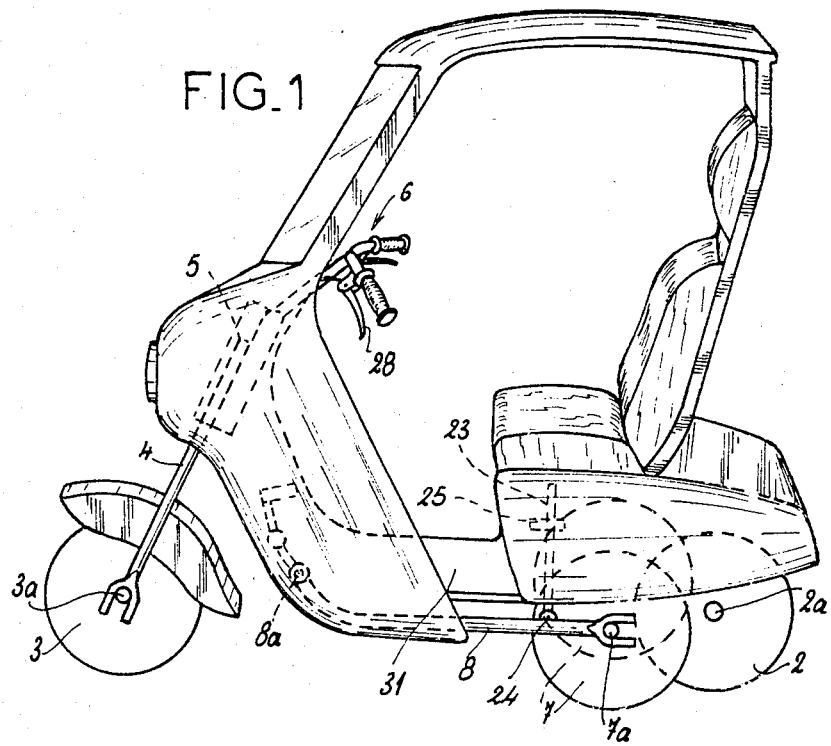
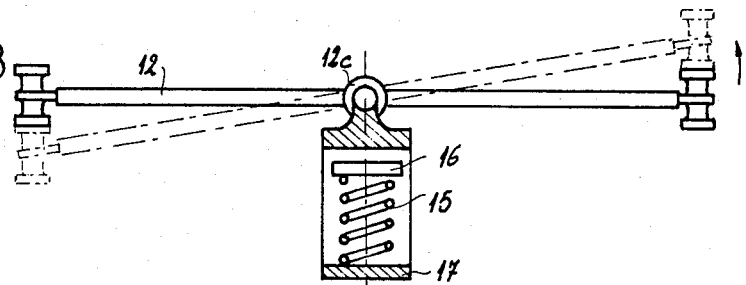
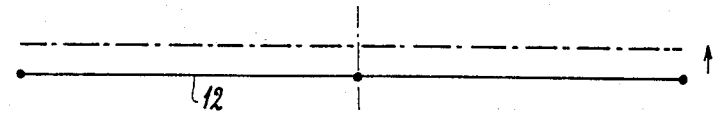
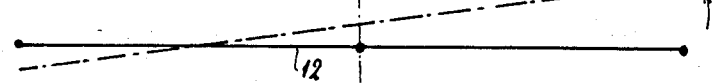

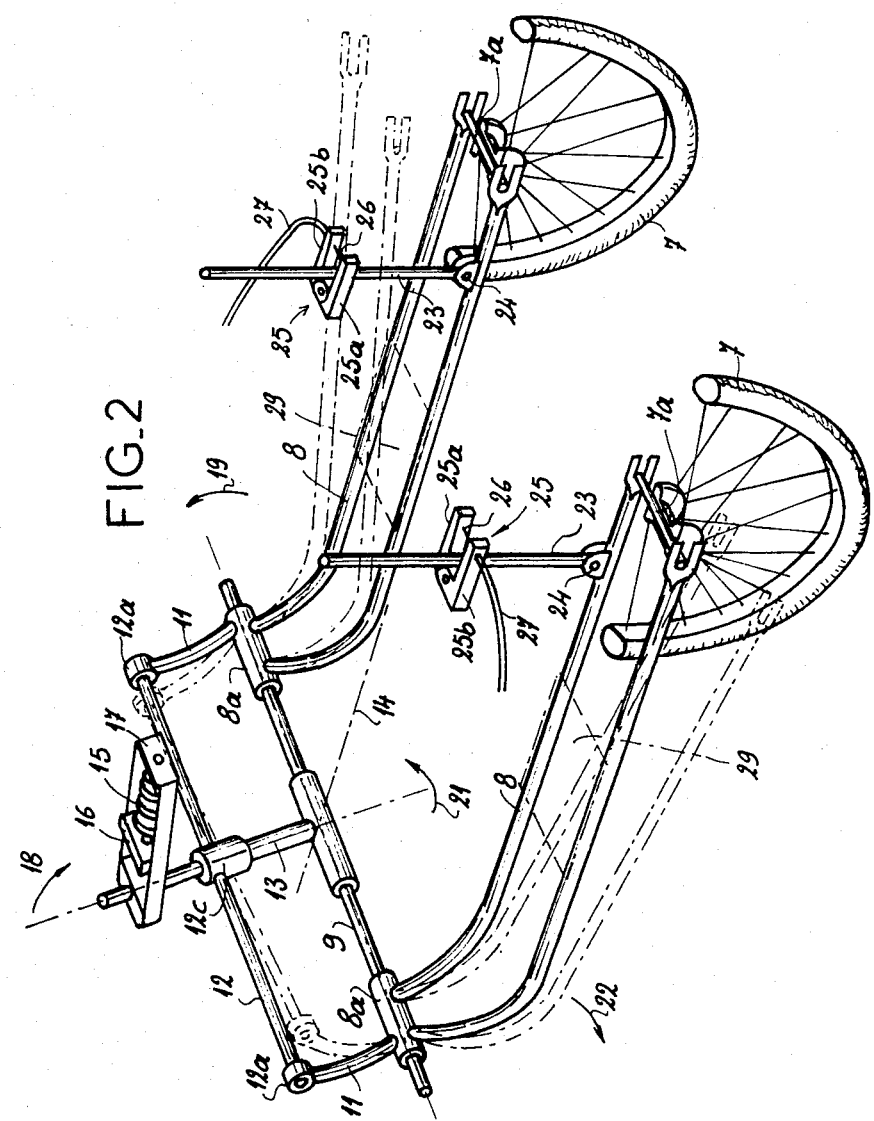

FOUR-WHEEL VEHICLE

BACKGROUND OF THE INVENTION

This invention pertains to four wheeled vehicles built around a moped, motor bike or the like two wheeled vehicle. In known vehicles of this type, either the stabilizing wheels are retractable when the vehicle is moving or are intended only to assure its stability when it is stopped. If they keep their contact with the ground during maneuvers of the handlebars, this disturbs the natural conditions of dynamic equilibrium of the vehicle since nothing is provided to take into account clearances of the stabilizing wheels by irregularities of the ground of one or other or both in a straight line or during turning.

SUMMARY AND ADVANTAGES OF THE INVENTION

This invention aims at remedying these drawbacks. For this purpose, in the vehicle it relates to and which is of the type mentioned above, each stabilizing wheel is carried by a yoke whose central branch is connected to a common stationary horizontal shaft perpendicular to the plane of symmetry of the vehicle and solid with the frame. Each yoke carries an arm whose free end is fastened to one of the ends of a whippletree whose center is connected to a secondary shaft perpendicular to the common shaft and able to pivot around the common shaft against a force exerted on it by means tending to make it swing in the direction corresponding to the application of the side wheels to the ground. Means are provided to lock or unlock, at will, the yokes carrying the side wheels, in the position they occupy.

This vehicle therefore offers the advantage of being driven in the same way as any two-wheeled motorized vehicle, such as mopeds, motor bikes and others, and is able to be held in stable position when stopped without the user having to at least put his foot on the ground in case of a sudden stop as at a red light or without resorting to a kickstand for extended standing as on a parking lot. This arrangement therefore makes it possible to in effect give a body to a two wheeled vehicle as desired.

According to the simplest embodiment of the invention, the means for locking the yokes carrying the side wheels consists of footrest plates fastened on the yokes and on which the driver can exert sufficient pressure to obtain locking of the yokes.

However, according to a preferred embodiment of the invention, the means for locking the yokes carrying the side wheel comprise, in association with each yoke, on the one hand, a rod connected by one of its ends, to the yoke under consideration and mounted to slide in a guide element assuring that it is held in fairly vertical position directed upward and, on the other hand, a clamp whose jaws, permanently engaged on said rod, are normally kept in open position by a spring and whose mobile jaw is connected, by a cable, to a common control element in locked position.

This control element can be a pedal or a handle mounted on the vehicle handlebar. In any case, to make possible the maintenance of this element in clamp locking position, which, in the absence of a kickstand, is necessary when the vehicle is left standing, a locking catch is associated with this element in a known way.

In this preferred embodiment of the invention, as in the simplest embodiment, each yoke, carrying a side wheel, can support a footrest plate enabling the driver to participate in keeping the side wheels in contact with the ground. However, it is also possible to provide a footrest preventing the driver from disturbing the natural clearances of the side wheels.

Moreover, to meet regulations, the control element, a connected pedal or handle, of at least one of the front or back brakes of this vehicle is also equipped with a locking catch thus providing this vehicle with a parking brake.

BRIEF DESCRIPTION OF THE DRAWING

In any case, the invention will be better understood from the following detailed description, with reference to the accompanying drawings representing, by way of nonlimiting example, an embodiment of a vehicle of the invention:

FIG. 1 is a perspective view;

FIG. 2 is a partial perspective view, showing the mode of mounting the side wheels; and FIGS. 3 to 7 are very diagrammatic top plane views illustrating the functioning of the stabilizing side wheels.

DETAILED DESCRIPTION OF THE PREFERRED EMBODIMENTS

As shown in FIG. 1, this vehicle is of the type whose chassis consists of a frame, not shown in the drawing, and is equipped with four wheels arranged in a rhombus pattern, namely, a driving rear wheel 2, a directing front wheel 3 and two stabilizing side wheels 7. The axle 2a of the back drive wheel 2 is carried by the frame while the axle 3a of the front wheel 3 is carried by a fork 4 guided in the tube 5 of the frame and solid with a handlebar 6. These two back 2 and front 3 wheels are centered on the plane of symmetry of the vehicle. Axle 7a of each stabilizing wheel 7 is carried by a yoke 8 whose central branch 8a is connected to a stationary horizontal shaft 9 perpendicular to the plane of symmetry of the vehicle and carried by the frame of this latter. This shaft 9 is common to the two yokes 8 of the side wheels 7. Each central branch 8a of a yoke 8 carries an approximately radial arm 11 connected to one of the ends 12a of a whippletree 12 whose center 12c is connected to a secondary shaft 13 perpendicular to the main shaft 9 mentioned above and which, thereby, is housed in the plane of symmetry of the vehicle represented in FIG. 2 by shaft 13 and line 14. This secondary shaft 13 is mounted to pivot around the common shaft 9. A spring 15 is compressed between a support plate 16 solid with the vehicle frame and a collar 17 solid with the connecting shaft 13 of whippletree 12. Spring 15 tends to make this shaft 13 swivel about the central point 12c of the whippletree 12 in the direction of arrow 18.

It should be noted that the connections between each arm 11 of a yoke 8 and the corresponding end 12a and the whippletree 12, on the one hand, and between the central point 12c of the whippletree 12 and the pivoting shaft 13, on the other hand, are flexible connections allowing secondary rotations, i.e., whose bearings allow a certain angular clearance.

It is understood that, under these conditions, the action of the spring 15 on the pivoting axis 13 and consequently on the whippletree 12 has the effect of tending to keep the side wheels 7 applied to the ground, since the pivoting of the pivoting shaft 13, in the direction of the arrow 18 is reflected by a pivoting of the arms 11 and yokes 8 in the same direction around the common shaft 9.

The presence of the side wheels 7, which are therefore normally kept in contact with the ground as a result of the action of the spring 15, does not have the effect of disturbing the driving of the vehicle, particularly in turns, as can be seen from an examination of FIG. 2.

Actually, when the vehicle turns to the side, for example to the right, it adopts a position inclined toward the inside of the turn, which has the effect of tending to push the corresponding side wheel 7 into the ground. The reaction of the ground on this side wheel 7 causes its lifting in relation to the vehicle and consequently the pivoting of the corresponding yoke 8, in the direction of the arrow 19 around the common shaft 9, as shown in broken lines in FIG. 2. The corresponding pivoting of the arm 11 solid with the right yoke 8 tends to make the whippletree 12 pivot in the direction of the arrow 21 around the secondary shaft 13, without anything opposing this pivoting, since at the same time, the left side wheel 7 has a tendency to be lifted off the ground as a result of the inclination of the vehicle to the right. The secondary shaft 13 therefore does not have a tendency to pivot and said pivoting of the whippletree 12 therefore has the effect of causing the pivoting of the yoke 8 supporting the left side wheel 7 around the common shaft 9 in the direction of the arrow 22, i.e., in the direction opposite that of the arrow 19, as shown in broken lines in this figure.

It can be seen that mounting of the side wheels 7 assures their being kept in contact with the ground both when the vehicle is moving in a straight line and when it goes around curves in an inclined position.

As related above, the spring 15 has the role of assuring that the side wheels 7 are kept in contact with the ground, and it also has the role of a suspension element by making possible the absorption of irregularities of the ground.

Actually, when a single side wheel 7 is lifted by an irregularity on the ground, when the vehicle is moving in a straight line, i.e., without its adopting an inclined position allowing a compensation of the lifting of a side wheel 7 by sinking of the other, the compression of the spring 15 allows a pivoting of the whippletree 12 around its end 12a opposite that located on the same side as the lifted side wheel 7.

In case both side wheels 7 should be lifted simultaneously by an irregularity on the ground, compression of the spring 15 would allow pivoting of the whippletree 12 and its secondary shaft 13 around the common shaft 9, in the direction opposite the arrow 18, thus making possible absorption of this irregularity without disturbing the line of movement of the vehicle.

FIGS. 3 to 7 illustrate the behavior of the whippletree 12 as a function of the conditions under which the vehicle is found.

As indicated above, FIG. 2 shows, in mixed dot-dash and solid lines, the behavior of the whippletree 12 and the yokes 8 during a right turn. FIG. 3 also shows the behavior of the whippletree 12 during a right turn of this vehicle. FIG. 4 illustrates a left turn in the same way as FIG. 3. FIG. 5 illustrates the suspension effect played by the spring 15 when the vehicle moves in a straight line. FIG. 6 illustrates the suspension effect on both side wheels 7 being added to the effect of a right turn. And, finally, FIG. 7 illustrates the suspension effect when only the right wheel passes over an obstacle while the vehicle is moving in a straight line.

It was indicated above that the presence of the side wheels 7 in no way hinders the driving of the vehicle. However it can easily be seen that to justify their presence, they must be able to contribute to the stability of the vehicle when stopped, whether this stop is momentary, as for a red light, or for an extended time, as on a parking lot. For this purpose, it is essential that they be provided with means for locking the yokes 8 in the position they occupy at the moment of stopping. In the example shown in the drawing and more particularly in FIG. 2, these means comprise a rod 23 connected by one of its ends to one of the side branches of the yoke 8 in question, with a crosswise pin 24 and normally kept directed fairly vertically upward by a guide element 25 carried by the vehicle frame and made also to act as a locking means. For this purpose, element 25 comprises a stationary jaw 25a and a mobile jaw 25b, both engaged on the rod 23, normally held by a spring, not shown in the drawing in the open position, i.e., unlocked position in which the rod can freely slide coaxially and which can be brought into locking position by a cable 26 guided in a sheath 27 and able to act on the mobile jaw 25 to assure locking of the rod 23 and this prevents any axial movement.

It suffices for the cable 26 to be connected to a maneuvering element such as an articulated handle 28 mounted on the vehicle handlebar 6 simultaneously controlling the two locking elements 25 of the two rods 23 to enable the vehicle to be kept in a stable position even when stopped. So that this stable position will be maintained even when the driver leaves his vehicle, and without it being necessary to have a kickstand, it suffices to, in a known manner, equip the articulated control handle 28 with a catch for locking the locking means in locked position.

This type of vehicle is generally equipped with two brakes, a front brake acting on the front wheel, and a back brake acting on the back wheel. It is advantageous to provide, as is provided on some motorized two-wheel vehicles such as motor bikes, means to permit the front brake to be controlled by an articulated lever mounted on the right side of the handlebar, and the back brake be controlled by a pedal accessible by the driver's right foot. This makes it possible to mount the handle 28 for controlling locking of the side wheel 7 on the left side of the handlebar 6, i.e., the usual place for the clutch control of a motor bike. This arrangement therefore offers the advantage of not modifying the driver's reflexes since locking of the side wheels 7 should be controlled at the same time as the clutch of a vehicle so equipped.

It was indicated above that locking of the locking means for the side wheels 7 had the aim of avoiding the need of providing a kickstand to keep the vehicle stable in parking position. In this case, since regulations require it, the control means for at least one of the front or back brakes is also equipped with a locking catch making it possible to use the brake as a parking brake.

The presence of side wheels 7 and their locking possibility therefore makes it possible to put a body, such as that shown in FIG. 1, on this vehicle. The body protects the driver from the weather and therefore makes use of this invention vehicle much more comfortable than that of other vehicles of this type. The possibility of keeping the invention vehicle in a stable balance, even when it has been momentarily stopped, makes it possible to provide a more enveloping body since the driver is no longer obliged to assure that the stability of the vehicle is maintained during a stop by putting at least his foot on the ground.

It is possible, if desired, to provide a footrest plate 29 carried by the lateral brances of each yoke 8 and allowing the vehicle driver to participate in keeping the side wheels 7 in contact with the ground; these footrest plates 29 are shown in dashed lines in FIG. 2.

However, as shown in FIG. 1, preferably, a footrest 31 is provided that prevents the driver from disturbing the natural clearances of the side wheels 7.

While the invention has been described in detail above, it is to be understood that this detailed description is by way of example only, and the protection granted is to be limited only within the spirit of the invention and the scope of the following claims.

I claim:

1. A four wheeled vehicle having a longitudinal plane of symmetry, said vehicle being drivable in a manner similar to a moped or the like, the four wheels of said vehicle being arranged in a rhombus pattern and including a rear drive wheel and a front steering wheel, said vehicle comprising a frame and a front fork, said front wheel being carried in said fork, a handlebar mounted on said fork, said four wheels further comprising a pair of side wheels each mounted in a yoke, each said yoke comprising a central branch, said frame comprises a common stationary horizontal shaft disposed generally perpendicular to said plane of symmetry, means to mount said central branches of said yokes to the end regions of said horizontal shaft, a whippletree, arm means connecting each end of said whippletree to each said central branch of said yokes, said whippletree comprises a secondary shaft disposed generally parallel to said plane of symmetry and connecting said whippletree to a central region of said horizontal shaft, means cooperable with said secondary shaft to cause said secondary shaft to pivot about the axis of said horizontal shaft against a force exerted on it tending to make it swing due to force generated by interaction of said side wheels with the ground, said cooperable means comprising a spring loaded framework joining said secondary shaft to said vehicle frame, and means to lock said yokes with respect to said vehicle frame.

2. The vehicle of claim 1, wherein said locking means comprises footrest plates fastened to said yokes, whereby the driver can exert a sufficient pressure to obtain locking of the yokes.

3. The vehicle of claim 1, wherein said locking means comprise, in association with each yoke, on the one hand, a rod connected, by one of its ends, to each yoke mounted to slide in a guide element assuring that it is kept upright in a substantially vertical position, and on the other hand, to a clamp one of whose jaws is permanently engaged on said rod and is normally kept in open position by a spring and whose mobile jaw is connected, by a cable means to a common control element.

4. The vehicle as in claim 3, wherein said element for controlling the locking means of the yokes comprising a handle mounted on said handlebar.

5. The vehicle as in claim 3, wherein the element for controlling the means for locking the yokes comprising a pedal.

6. The vehicle of claim 3, wherein the element for controlling the means for locking the yokes is associated with a locking catch.

7. The vehicle of claim 1, wherein there is provided a footrest preventing the driver from disturbing the clearances of said yokes carrying said side wheels.

8. The vehicle of claim 1, and parking brake means for said vehicle, said parking brake means comprising lock means cooperable with at least one of the normal front or rear wheel vehicle brake to manually lock said at least one brake.

* * * * *